United States Patent
Lakshmi Narayanan et al.

(10) Patent No.: US 7,420,943 B2
(45) Date of Patent: Sep. 2, 2008

(54) MECHANISM TO CREATE PINHOLE FOR EXISTING SESSION IN MIDDLEBOX

(75) Inventors: Ram Gopal Lakshmi Narayanan, Woburn, MA (US); Sanjeev Verma, Woburn, MA (US)

(73) Assignee: Nokia Corporation, Espoo (FI)

( * ) Notice: Subject to any disclaimer, the term of this patent is extended or adjusted under 35 U.S.C. 154(b) by 1063 days.

(21) Appl. No.: 10/314,494

(22) Filed: Dec. 6, 2002

(65) Prior Publication Data

US 2004/0109458 A1 Jun. 10, 2004

Related U.S. Application Data

(60) Provisional application No. 60/338,096, filed on Dec. 6, 2001.

(51) Int. Cl.
*H04Q 7/00* (2006.01)

(52) U.S. Cl. .................................. 370/331; 370/401

(58) Field of Classification Search .................. 370/401
See application file for complete search history.

(56) References Cited

U.S. PATENT DOCUMENTS

| 5,572,528 | A | 11/1996 | Shuen |
| 6,147,986 | A | 11/2000 | Orsic |
| 6,393,488 | B1 | 5/2002 | Araujo |
| 6,483,912 | B1 * | 11/2002 | Kalmanek et al. ........... 379/219 |
| 2002/0029189 | A1 | 3/2002 | Titus et al. |
| 2002/0133549 | A1 | 9/2002 | Warrier |
| 2003/0037176 | A1 | 2/2003 | Dannehr et al. |
| 2003/0093481 | A1 * | 5/2003 | Mitchell et al. ............. 709/206 |

FOREIGN PATENT DOCUMENTS

| EP | 1 047 279 A2 | 10/2000 |
| EP | 1047279 A2 | 10/2000 |
| WO | WO 01/22761 A1 | 3/2001 |

OTHER PUBLICATIONS

RFC 2663—IP Network Address Translator (NAT) Terminology and Considerations, Published Aug. 1999, www.ietf.org.*
RFC 721—Out-of-Band Control Signals in a Host-to-Host Protocol, Published Sep. 1976, www.ietf.org.*
Kato, T. et al., "*Mobile IP Using Private IP Addresses*", IEEE Symposium Jul. 3-5, 2001, pp. 491-497.
Shahrier, S. M., "*Incorporating NAY boxes in 1-12 Mobile IPv4*" XP-002319042 May 2001, pp. 1-6.

(Continued)

*Primary Examiner*—Chau Nguyen
*Assistant Examiner*—Dargaye H Churnet
(74) *Attorney, Agent, or Firm*—Squire, Sanders & Dempsey L.L.P.

(57) ABSTRACT

In mobile IP networks, when a mobile node (MN) 101 moves from one cell to another, handover occurs. The result of the handover is that the MN 101 connects to the network through a new access router (AR) 162. The handover may occur between access routers of the same or different administrative domains. In all cases, the information related to the MN 101 has to be transferred from the old AR 185 to the new AR 162 in order to minimize the effect of the change of access routers.

12 Claims, 2 Drawing Sheets

OTHER PUBLICATIONS

Su, Gong et al., "*Mobile Communication with Virtual Network Address Translation*", XP-002286437, Feb. 2002, pp. 1-14.

Perkins, Charles E., "*Mobile IP*", XP-000657114, IEEE Communications Magazine, May 1997, pp. 84-99.

Srisuresh, P., "*Middlebox Communication Architecture and Framework*", XP-002319043, Nov. 12, 2001, pp. 1-36.

Zhang, Y. et al., "*A "Persistent Connection" Model for Mobil and Distributed Systems*", IEEE, Sep. 20, 1995, pp. 300-307.

* cited by examiner

MECHANISM TO CREATE PINHOLE FOR EXISTING SESSION IN MIDDLEBOX

This application claims the benefit of U.S. Provisional Application No. 60/338,096, filed Dec. 06, 2001.

BACKGROUND

It is expected that Middle box like Network Address Translator (NAT) or Firewall or Proxy or ALG will not go away completely at least in near future. This box is going to exist in wireless networks due to a variety of reasons. For example, a wireless network provider would not like to expose the private addresses used in its network to the outside world. Similar problem also occurs, when a mobile user moves from a Wireless LAN (WLAN) environment (Office) to cellular network environment (Outside). Equipment's that provide services to the customers may include cache servers, proxy servers, content servers and load balancers. These equipments operate in private address space in a network provider's routing premise. This imposes a problem when the mobile user moves to the adjacent domain causing a hand-off. Currently standards are mainly looking into the issues of fast hand-offs and context transfer between access routers from one domain to another. The task of relocating context when the mobile node moves from one private address space to other private address space creates a problem especially when the mobile node has session with cache/content server which is in private address space of network provider.

NAT, Firewall, Multimedia buffers, Signature Management for Intrusion detection system are all considered to be Middle box and are deployed widely in the enterprise and expected to grow. As trusted third parties are increasingly being asked to make policy decisions on behalf of the various entities participating in an application's operation, a need has developed for applications to be able to communicate their needs to the devices in the network that provide transport policy enforcement.

Wireless network providers would like to use site-local private addresses in their networks. This creates a problem when the mobile node is connected to a content server and is downloading some data and hand-off occurs. It may be a good strategy to restart the session for certain applications but this strategy would not work for real-time interactive applications like gaming.

The above-mentioned references are exemplary only and are not meant to be limiting in respect to the resources and/or technologies available to those skilled in the art.

SUMMARY

The proposals in this invention include how to create a session dynamically in the middlebox in order to maintain the application context.

We provide possible ways how this can be achieved using policy-based schemes or application aware signalling to inform the state change in flow.

NAT, Firewall, Multimedia buffers, Signature Management for Intrusion detection system are all considered to be Middle box and are deployed widely in the enterprise and expected to grow. As trusted third parties are increasingly being asked to make policy decisions on behalf of the various entities participating in an application's operation, a need has developed for applications to be able to communicate their needs to the devices in the network that provide transport policy enforcement.

Wireless network providers would like to use site-local private addresses in their networks. This creates a problem when the mobile node is connected to a content server and is downloading some data and hand-off occurs. It may be a good strategy to restart the session for certain applications but this strategy would not work for real-time interactive applications like gaming.

An embodiment creates a session(s) in the middle-box by identifying the flows prior to context transfer by making use of policy mechanism or other suitable means. Our solution is valid for anyone of the three cases:

1. If the mobile node is having a session with content server or cache server or proxy server or any other service entity and if that entity is from the same Autonomous System (AS).
2. Or if both end points of the session are in private address space of the same AS.
3. Or if both end points are on the same routing domain but after the hand-off the session requires some VPN or other special service to maintain the session across AS.

For example, if a user is having a gaming session with the content server provided by his network operator (say in AS-1) and he moves to an adjacent routing domain (say AS-2) then his session will remain unaffected. It is assumed that during the context transfer both Mobile Node (MN) and the currently serving access router know each other's public addresses. Using addressing and flow information a pinhole can be created in the AS-1 and AS-2 middle-boxes.

BRIEF DESCRIPTION OF THE DRAWINGS

The disclosed inventions will be described with reference to the accompanying drawings, which show important sample embodiments of the invention, wherein.

DETAILED DESCRIPTION

Figure 1:
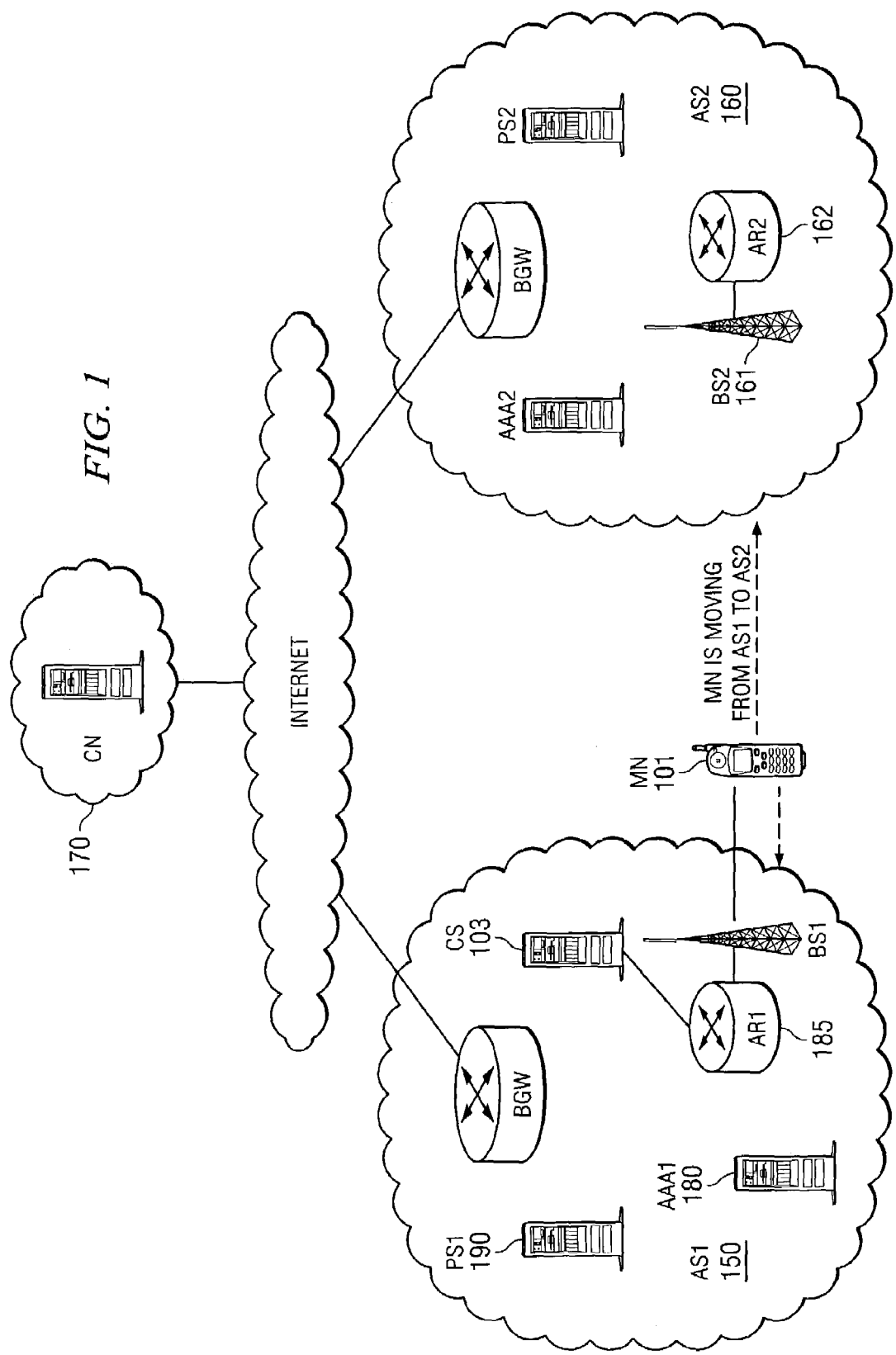
FIG. 1 shows a Reference architecture.

An embodiment of the invention may be very simple to implement and does not rely on any external data. When the mobile node moves from the old Autonomous System (AS) to the new AS, the context transfer occurs and at the same time authorization of the mobile user takes place. Using the context and authorization information, the application specific context is retained and the flow is maintained between client and server FIG. 1 shows the reference architecture showing the entities that are involved during the hand-off operation when the mobile node moves from one AS to another AS. The hand-off and context transfer may be done by using either candidate access router discovery [4] or policy based mechanism [3]. Here our focus is on specific flows which requires interaction with middle-box entities or the entities which requires special services like VPN when handoff occurs across AS.

In FIG. 1, MN 101 is currently in AS1 150 and has ongoing session(s) with Content/cache server (CS) 103 and with Core Network (CN) 170, which is outside the AS1 150 system. Since CS 103 is also CN 170 the key difference is that the CS 103 and MN 101 endpoints are within AS1 150 and may have site local address assignment and uses private address(es). To illustrate this scenario with an example, assume that AS1 150 is centered on a Nokia office and mobile node 101 has two radio interfaces, a first one, which can talk to wireless LAN, and another interface is cellular interface. Currently the mobile node 101 (user) is having a session with the content server with in the office premise using the wireless LAN network interface. Since the MN 101 is inside the office there may not need for any security because they are administered and physically protected network. The moment when the user is leaving the office and entering outside world (say AS-2) the hand-off occurs between the wireless LAN network and cellular network. The session has to be protected by applying some VPN and other service specific attributes. In this example we have show AS1(e.g. a Nokia office building and vicinity) is surrounded by AS-2, but this type of scenario may happen across two Internet Service Providers (ISPs).

Other information, like static capabilities of the MN 101 are stored in the AAA server 180, the policy server 190 can retrieve this information from the AAA 180 server of the MN home network. In the following, we describe the problem of inter domain hand-off.

For example, when the MN 101 is in the AS1 150, the static capabilities of the MN 101 are retrieved by PS1 190 from AAA1 server 180 and dynamic capabilities (or negotiated profiles) are kept with the access router AR1 185 that is currently serving the MN 101. When the MN 101 moves toward AS2 160, it receives identification information on a broadcast channel, which may contain link layer information of BS2 161 or IP address of AR2 162 or Autonomous System (AS) number associating some link local address or any combination information. With these information the context transfer occurs between two AS. The context transfer does not cover how to create a pinhole and how to apply flow specific characteristics to the middle-box.

Our proposal contains two steps, if the MN 101 has a ongoing session and whose endpoints lie with in AS1 150, that has to moved seamlessly without interrupting the application flow, this is done by creating a pin-hole in the middle-box for the ongoing session. Second both the CS 103 and MN 101 is to be informed through out-of-band signaling for those flows.

FIG. 1 shows a reference architecture. During the context transfer process, both the policy servers know each other's NAT addresses. It is the responsibility of the policy server to figure out endpoint addresses of an ongoing session. For example if both the session endpoints lie in the same AS, the pinhole has to be created on the fly during the context transfer process.

Figure 2:
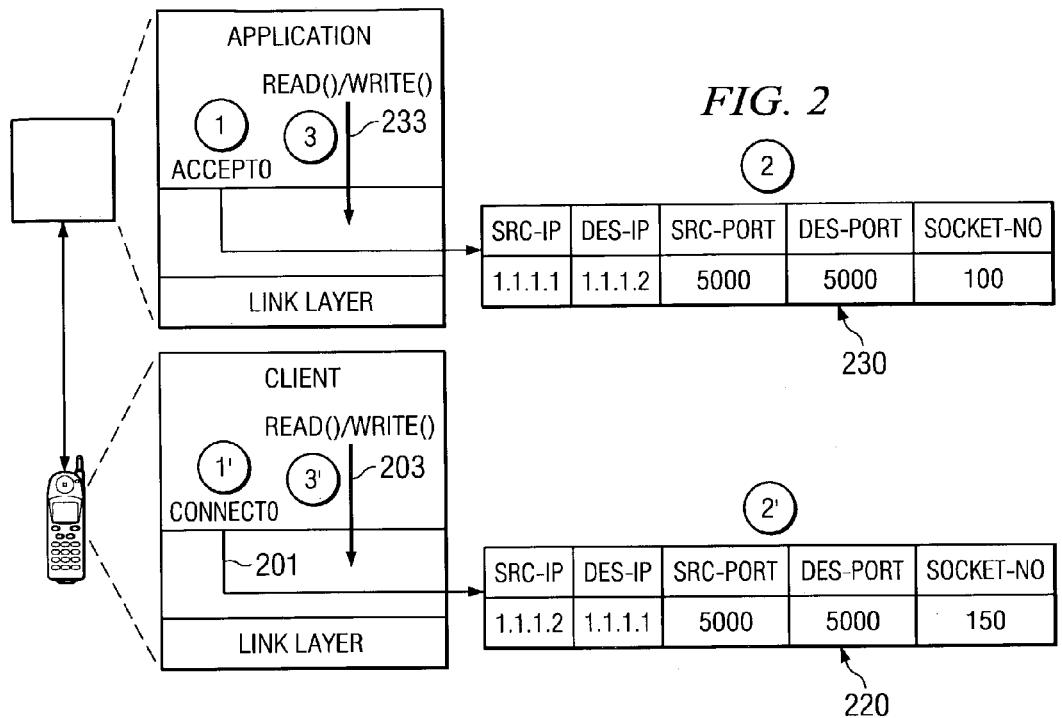
FIG. 2 shows a context transfer message flow, according to an embodiment.

The sequence of operations performed by the policy server in an AS domain are as shown in FIG. 2.

Figure 3:
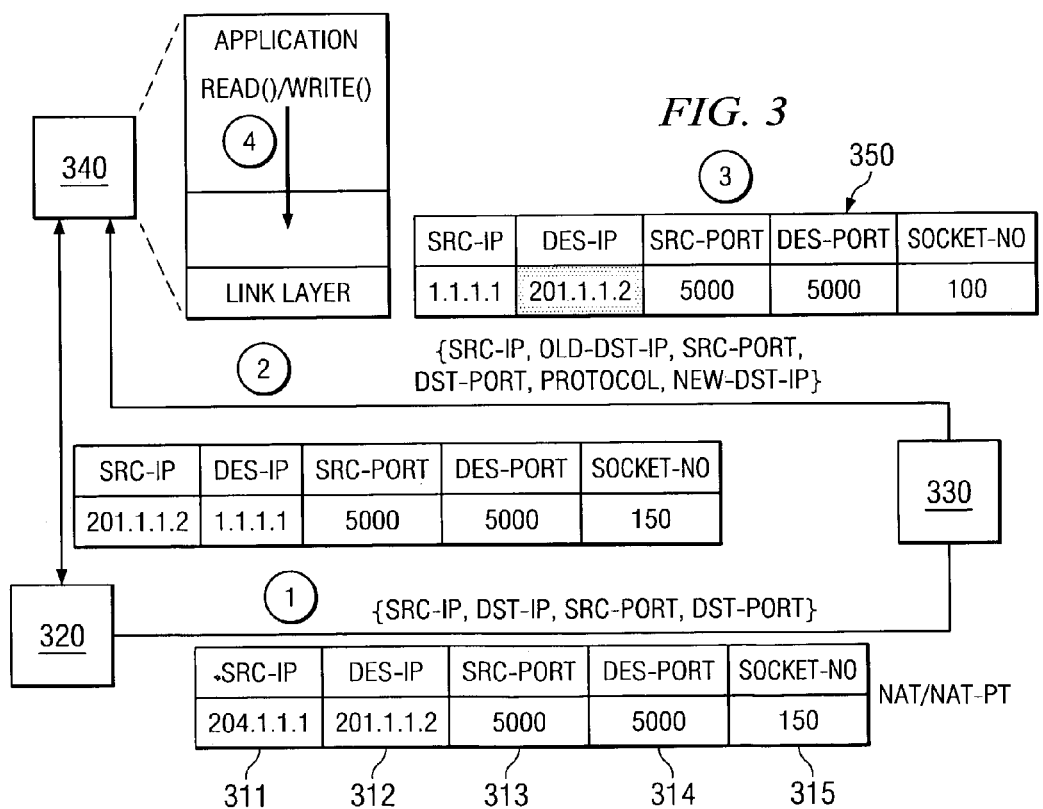
FIG. 3 shows a creation of pinhole in the NAT.

Message Flow in AS1 domain: For illustration purpose, we split the message exchanges into two parts, one that happens in the AS-1 routing domain and the other in the new AS-2 domain. FIG. 2 and FIG. 3 depicts exchange of messages before and after hand-off respectively.

The sequences of message exchange in AS-1 before hand-off are as shown in FIG. 3. Content server or application server waits for a connection request from a client (See message—1).

Client issues a connect system call 201; Both client and Server create a table entry, e.g. client table 220 and server table 230. Client and Server perform normal read/write operations e.g. client read/write 203 and server read/write 233.

FIG. 2: Session between MN 101 and Content server before the hand-off.

The sequences of message exchange in the AS-1 during hand-off are as follows:

1. After the policy server 330 has identified the flow, which requires pinhole creation in the middlebox, policy server 330 sends a signalling message to the NAT device 320 with complete state information. This includes src-ip 311, dst-ip 312, src-port 313, dst-port 314, and other sliding window parameters 315.

NAT 320 creates an entry in the NAT table as if the session has been started and initializes the state variables. Also, if the session needs special services (e.g. VPN), then the additional service specific parameters are exchanged.

NAT 320 also creates a session with the NAT/AS-2 during this process.

2. Policy server 330 then forward the destination IP address of the AS NAT 321 to the Content server 340.

3. Content server 340 now updates the sock_entry table 350.

4. Now the packets from the application are directed through NAT 320 to the new AS-2

Similar message flow happens in the AS-2 domain, where the policy server informs the NAT and also the mobile node.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A method comprising:
   changing a session endpoint maintained at a content server, wherein the session endpoint has a first network address translator destination internet protocol address hosted by a first network address translator having a network address translator table;
   identifying a flow which requires pinhole creation;
   receiving a signaling message at the first network address translator, the signaling message comprising state information;
   creating a table entry in the network address translator table; and
   creating a session between the first network address translator and a second network address translator.

2. The method of claim 1, further comprising:
   forwarding a second network address translator destination internet protocol address from a policy server to the content server.

3. The method of claim 2, wherein the policy server comprises a component of an autonomous system, and the network address translator comprises a component of the autonomous system.

4. The method of claim 3, further comprising:
   updating a sock_entry table.

5. The method of claim 1, wherein the receiving a signaling message comprises receiving the signaling message from a policy server.

6. The method of claim 1, further comprising:
   initializing at least one state variable after the receiving of a signaling message.

7. An apparatus comprising:
   a receiver configured to receive a signaling message at a first network address translator, the signaling message comprising state information, wherein the apparatus is configured to change a session endpoint maintained at a content server and wherein the session endpoint has a first network address translator destination Internet protocol address hosted by the first network address translator having a network address translator table;

a network address translator table configured to create a table entry, said network address translator table operatively coupled to the receiver; and a creator configured to create a session between the first network address translator and a second network address translator.

8. The apparatus of claim 7 further comprising:

a forwarder configured to forward a second network address translator destination Internet protocol address from a policy server to a content server.

9. The apparatus of claim 7 further comprising:

an updater configured to update a sock_entry table.

10. The apparatus of claim 7, wherein the receiver comprises a receiver configured to receive the signaling message from a policy server.

11. The apparatus of claim 10, wherein the signaling message is an out-of-band signal.

12. An apparatus comprising:

receiving means for receiving a signaling message at a first network address translator, the signaling message comprising state information;

changing means for changing a session endpoint maintained at a content server, wherein the session endpoint has a first network address translator destination Internet protocol address hosted by the first network address translator having a network address translator table;

network address translator table means for creating a table entry, said network address translator table means operatively coupled to the receiving means; and creating means for creating a session between the first network address translator and a second network address translator.

* * * * *